Nov. 18, 1924.
F. D. MILES
1,516,450
MANUFACTURE OF INDOPHENOLIC BODIES
Filed Dec. 27, 1923
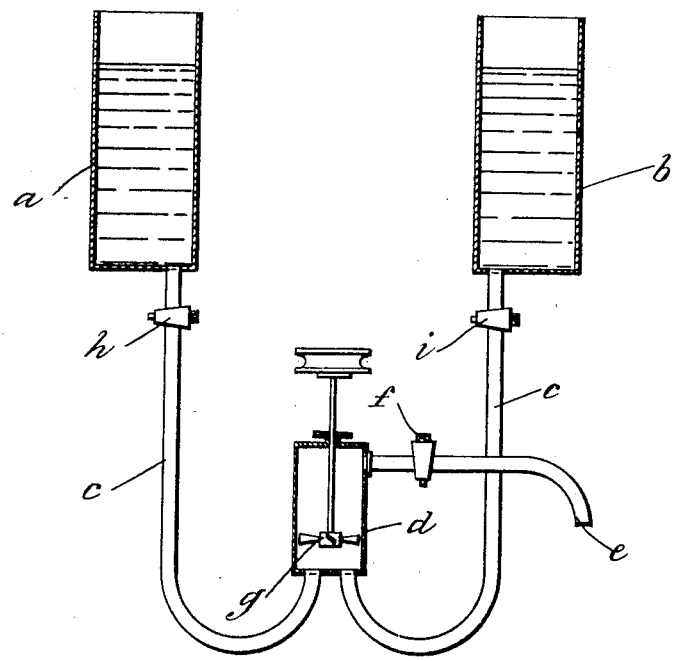
Inventor
Frank Douglas Miles
By
Attorney Patented Nov. 18, 1924.

1,516,450

UNITED STATES PATENT OFFICE.

FRANK DOUGLAS MILES, OF AYRSHIRE, SCOTLAND.

MANUFACTURE OF INDOPHENOLIC BODIES.

Application filed December 27, 1923. Serial No. 683,022.

*To all whom it may concern:*

Be it known that I, FRANK DOUGLAS MILES, a subject of His Majesty the King of Great Britain, residing in Ayrshire, Scotland, have invented a certain new and useful Improved Manufacture of Indophenolic Bodies, of which the following is a specification.

Known methods of conducting the condensation of para-nitrosophenol, or a homologue thereof, with carbazole or other compound capable of producing an indophenolic body, comprise (1) the introduction of a sulphuric acid solution of one of the bodies into a like solution of the other, in which case the conditions are such that the introduced body is nearly throughout in deficiency relatively to that already in the reaction vessel, and (2) the introduction of an equimolecular mixture of the bodies into a relatively considerable volume of sulphuric acid.

According to the present invention sulphuric acid solutions of the bodies are caused to flow simultaneously into the reaction vessel in such proportion to each other as corresponds with their molecular content of the reacting bodies and steps are taken to precipitate the product from the mixture as soon as practicable after it has been formed, such as by allowing the mixture to flow from the reaction vessel to the precipitating vessel pro rata as the solutions are introduced into the reaction vessel. For instance, if the sulphuric acid solution of each body contains one molecular proportion of that body in unit volume, the flow will be such that equal volumes enter the vessel in the same time; should one solution contain in unit volume 2 molecular proportions of its body and the other 1 molecular proportion of its body, then 1 volume of the first solution would enter the reaction vessel in the same time as 2 volumes of the second, and so on.

Vigorous stirring during mixing is necessary. This may be conducted in a mixing chamber of the smallest practicable volume so that the mixed solution is carried as rapidly as possible to the precipitating vessel. In this way the time during which undesirable chemical changes may occur in the mixed solution is reduced as far as possible. The solutions may be cooled before mixing for instance to —8° C. and it is also advisable to cool the mixing vessel during the reaction.

For example, 4 lbs. of carbazole of 92 per cent strength are dissolved in 2.5 gallons of sulphuric acid of 94 per cent strength and 2.74 lbs. of para-nitrosophenol are dissolved in a like amount of acid. Each solution is cooled to —8° C. and they are run together at the same rate into the bottom of a pot, the capacity of which is one gallon or less, suitably cooled and containing a stirring apparatus. From the top of the pot the mixture runs on to about 200 lbs. of crushed ice to precipitate the indophenol. The 5 gallons may flow through the pot in about 15 minutes.

The accompanying diagram illustrates an apparatus suitable for the process when equal volumes of sulphuric acid are used for making the two solutions, as indicated in the foregoing numerical example.

*a* and *b* are reservoirs of the same diameter. Each communicates by a comparatively wide pipe *c* with a mixing vessel *d* of much smaller capacity than that of the reservoirs, these pipes being of the same diameter. A pipe *e* leading from the top of vessel *d* serves for discharge of the mixture to the precipitating vessel, which is not shewn. The cock *f* in this pipe is adjusted for the desired rate of flow of the two solutions from reservoirs *a* and *b*, in which the solutions stand at the same level. The stirrer *g* having been started the cocks *h* and *i* in the pipes *c* respectively are fully opened, whereupon the solutions flow at equal rates into the vessel *d*, where the reaction occurs, and the sulphuric acid solution of the product flows away through pipe *e*.

The nitrosophenol being more soluble in sulphuric acid than the carbazole is, it is preferable to use a solution of nitrosophenol more concentrated than that of carbazole; in this case the reservoir which is to hold the nitrosophenol solution is correspondingly smaller than that which is to hold the carbazole solution, so that the liquids may flow under the same hydrostatic head, and the cocks *h* and *i* are adjusted to ensure the passage of the liquids in the proper proportion.

Having thus described the nature of my said invention and the best means I know of carrying the same into practical effect, I claim:—

1. A process for the manufacture of indophenolic bodies, which consists in dissolving separately in sulphuric acid the bodies which are to react, causing the solutions to flow simultaneously into a reaction vessel in such proportion to each other as corresponds with their molecular content of the bodies which are to react, and vigorously stirring the contents of the said vessel so as to mix rapidly the incoming solutions.

2. A process for the manufacture of indophenolic bodies, which consists in dissolving separately in sulphuric acid the bodies which are to react, causing the solutions to flow simultaneously into a reaction vessel in such proportion to each other as corresponds with their molecular content of the bodies which are to react, vigorously stirring the contents of the said vessel so as to mix rapidly the incoming solutions and precipitating the product of reaction from the mixture directly after the intermixing is complete.

3. A process for the manufacture of indophenolic bodies, which consists in dissolving separately in sulphuric acid the bodies which are to react and causing the solutions to flow, simultaneously and in such proportion to each other as corresponds with their molecular content of the bodies which are to react, through a reaction vessel on their way to a precipitating vessel, the capacity of the reaction vessel being no greater than is necessary for the complete intermixing of the solutions therein by vigorously stirring.

In testimony whereof I have signed my name to this specification.

FRANK DOUGLAS MILES.

Witnesses:
  VINCENT COOKE,
  CHAMBERS ANDERSON.